US 9,401,169 B1

(12) United States Patent
Canchi et al.

(10) Patent No.: US 9,401,169 B1
(45) Date of Patent: Jul. 26, 2016

(54) IMPLEMENTING ENHANCED ULTRAFAST TOUCHDOWN MEASUREMENT SCHEME USING THERMAL AND VOLTAGE ACTUATION FOR HARD DISK DRIVES

(71) Applicant: HGST Netherlands B.V., Amsterdam (NL)

(72) Inventors: Sripathi Vangipuram Canchi, Sunnyvale, CA (US); Sukumar Rajauria, San Jose, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/790,211

(22) Filed: Jul. 2, 2015

(51) Int. Cl.
   *G11B 5/60* (2006.01)
(52) U.S. Cl.
   CPC .............. *G11B 5/6076* (2013.01); *G11B 5/607* (2013.01); *G11B 5/6035* (2013.01)
(58) Field of Classification Search
   None
   See application file for complete search history.

(56) References Cited

U.S. PATENT DOCUMENTS

| | | | | |
|---|---|---|---|---|
| 7,286,314 B2 * | 10/2007 | Baumgart | ............... | G11B 21/21 360/75 |
| 7,310,197 B2 * | 12/2007 | Baumgart | ............ | G11B 5/6017 360/75 |
| 7,310,198 B2 * | 12/2007 | Baumgart | ............... | G11B 21/21 360/75 |
| 7,450,333 B2 | 11/2008 | Hirano et al. | | |
| 7,542,228 B2 * | 6/2009 | Knigge | ................ | G11B 5/3136 360/75 |
| 7,660,068 B1 * | 2/2010 | Baumgart | ................ | G11B 5/40 360/75 |
| 7,679,857 B2 | 3/2010 | Zhu et al. | | |
| 7,719,786 B1 * | 5/2010 | Baumgart | ............ | G11B 5/6005 360/75 |
| 7,830,634 B2 * | 11/2010 | Chen | ...................... | G11B 27/36 360/75 |
| 8,049,984 B2 * | 11/2011 | Contreras | ............ | G11B 5/6011 360/245.8 |
| 8,085,490 B2 * | 12/2011 | Franca-Neto | ........ | G11B 5/6029 360/75 |
| 8,139,309 B2 | 3/2012 | Knigge et al. | | |
| 8,149,541 B2 | 4/2012 | Baumgart et al. | | |
| 8,279,550 B1 | 10/2012 | Hogg | | |
| 8,335,053 B2 | 12/2012 | Chen et al. | | |
| 8,599,506 B2 * | 12/2013 | Contreras | ............ | G11B 5/6011 360/31 |
| 8,611,035 B1 | 12/2013 | Bajikar et al. | | |
| 8,630,057 B2 * | 1/2014 | Murthy | ................ | G11B 5/6076 360/75 |
| 8,995,076 B1 * | 3/2015 | Olson | .................... | G11B 5/596 360/69 |
| 2010/0259850 A1 | 10/2010 | Miyake et al. | | |
| 2012/0120527 A1 | 5/2012 | Kunkel et al. | | |
| 2013/0148230 A1 | 6/2013 | Jin et al. | | |
| 2013/0335843 A1 | 12/2013 | Santoso et al. | | |
| 2013/0335852 A1 | 12/2013 | Murthy et al. | | |

FOREIGN PATENT DOCUMENTS

CN          10158771          10/2012

OTHER PUBLICATIONS

"Impact of Touchdown Detection on Bit Patterned Media Robustness" http://proceedings.asmedigitalcollection.asme.org/proceeding.aspx?articleid=1788079.
"Dynamic Flying Height Adjustment in Hard Disk Drives Through Feed forward Control" http://maeresearch.ucsd.edu/callafon/publications/2011/UweIEEETonM.pdf.

* cited by examiner

*Primary Examiner* — Wayne Young
*Assistant Examiner* — James L Habermehl
(74) *Attorney, Agent, or Firm* — Joan Pennington (57) ABSTRACT

A method, apparatus, and system are provided for implementing touchdown measurement using thermal and voltage actuation for hard disk drives (HDDs). The touchdown measurement uses a constant power applied to a thermal flyheight control (TFC) and an electrostatic voltage bias pulse is applied between the slider body and the disk to actuate the slider into contact with the disk.

20 Claims, 9 Drawing Sheets

IMPLEMENTING ENHANCED ULTRAFAST TOUCHDOWN MEASUREMENT SCHEME USING THERMAL AND VOLTAGE ACTUATION FOR HARD DISK DRIVES

FIELD OF THE INVENTION

The present invention relates generally to the data storage field, and more particularly, relates to a method, apparatus, and system for implementing touchdown measurement using thermal and voltage actuation for hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Touchdown measurement is a mandatory requirement for clearance estimation in hard disk drives. Today, the measurement is done by supplying power to the thermal flyheight control (TFC) heater, which causes a thermal protrusion of the read/write head location bringing it closer to the disk. The power required to make the thermal protrusion contact the disk is the touchdown power (TDP). Once the TDP is obtained, the magnetic spacing loss techniques can be used to obtain clearance change information relative to this TDP, which is the condition of contact.

Head wear is a big concern in TDP tests. Currently, the TDP value for each track (or a band of tracks) is determined by performing a TDP test that lasts several disk revolutions. A reduction in the duration of contact is desirable to not only reduce the head wear, but also to reduce the total test duration, which also makes it attractive for in-field touchdown measurements.

SUMMARY OF THE INVENTION

Aspects of the preferred embodiments are to provide a method, apparatus, and system for implementing touchdown measurement using thermal and voltage actuation for hard disk drives (HDDs). Other important aspects of the preferred embodiments are to provide such method, apparatus, and system substantially without negative effect and to overcome some of the disadvantages of prior art arrangements.

In brief, a method, apparatus, and system are provided for implementing touchdown measurement using thermal and voltage actuation for hard disk drives (HDDs). The touchdown measurement uses a constant power applied to a thermal flyheight control (TFC) and an electrostatic voltage bias pulse is applied between the slider body and the disk to actuate the slider into contact with the disk.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system for implementing ultrafast touchdown measurement using thermal and voltage actuation for hard disk drives (HDDs). The combined thermal and interface voltage actuation includes a short voltage pulse duration bias applied between the slider and disk for electrostatic actuation enabling ultrafast touchdown detection, which reduces functional test time, for example with short pulse duration used in technologies such as cold storage, bit pattern magnetic recording (BPMR), microwave assisted magnetic recording (MAMR), heat assisted magnetic recording (HAMR), and perpendicular magnetic recording (PMR) hard disk drives (HDDs). Also the combined thermal and interface voltage actuation is simple to implement by circuit technique amenable to present preamp and front-end technologies.

In accordance with features of the preferred embodiments, the ultrafast touchdown method advantageously is used for targeted touchdown on a localized region of the disk. Such a targeted touchdown on particular localized regions of the disk is extremely beneficial in large form factor drives, such as those used in cold storage, where clearance variations around the disk revolution can be very large. In addition, due to longer rest periods in cold storage devices, it may be necessary to frequently recalibrate the touch down power (TDP) of the head on the disk in the field, and an efficient and ultrafast scheme is required for TDP mapping over the entire disk in the field.

Figure 1:
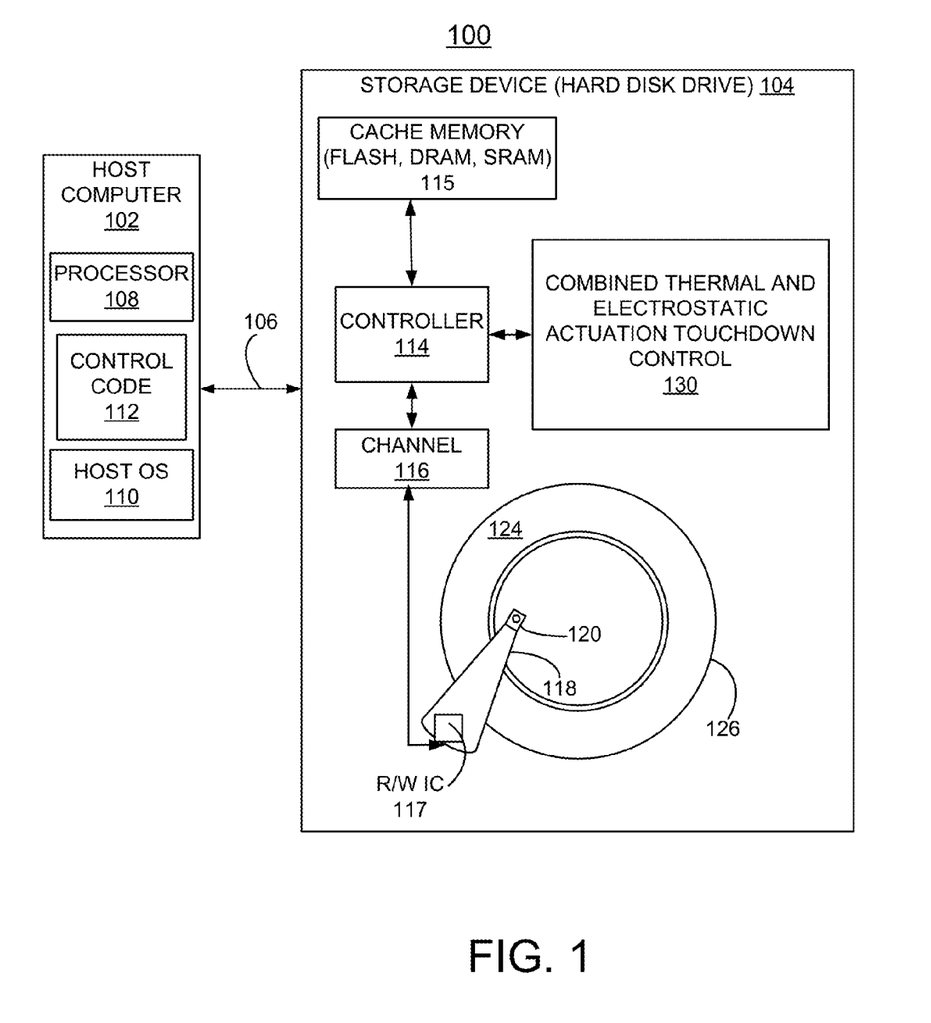
FIG. 1 is a block diagram representation illustrating a system for implementing touchdown measurement using thermal and voltage actuation for hard disk drives (HDDs) in accordance with preferred embodiments.

Having reference now to the drawings, in FIG. 1, there is shown an example system generally designated by the reference character 100 for implementing touchdown measurement using thermal and voltage actuation for various hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing ultrafast touchdown measurement using thermal and voltage actuation of the preferred embodiments. The storage device or hard disk drive 104 includes an arm 118 carrying a slider 120 for in accordance with preferred embodiments. The slider 120 flies over a writable disk surface 124 of a disk 126.

In accordance with features of preferred embodiments, a combined thermal and electrostatic control 130 is provided with the controller 114, for example, for implementing ultrafast touchdown measurement using thermal and voltage actuation for hard disk drives (HDDs).

System 100 including the host computer 102 and the HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

Figure 2:
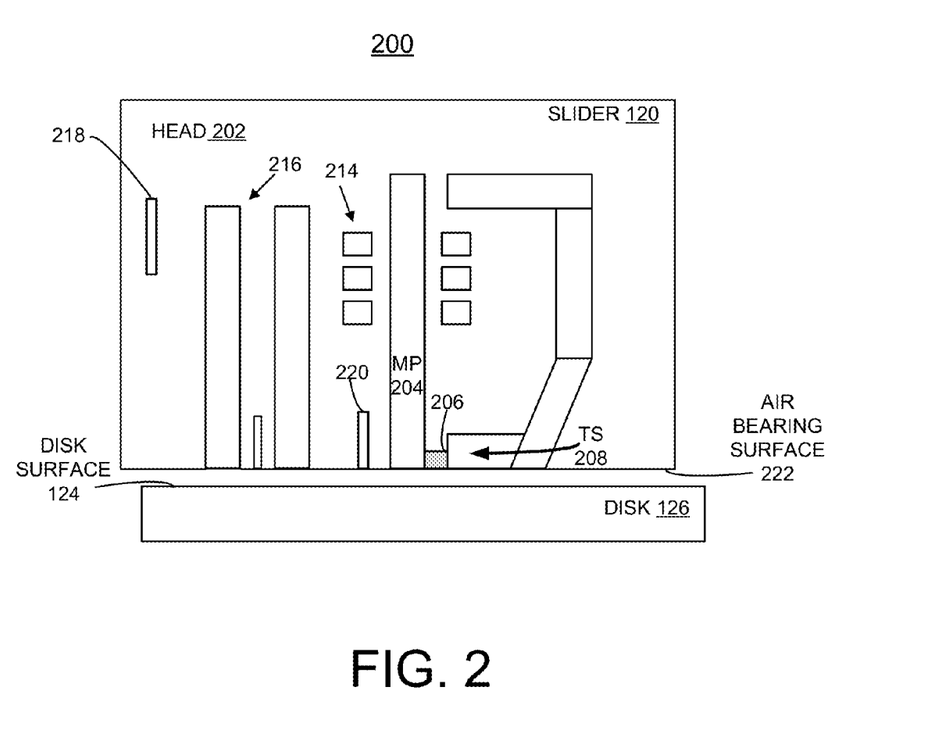
FIG. 2 schematically illustrates an example slider, head, and disk apparatus for implementing touchdown measurement using thermal and voltage actuation for hard disk drives (HDDs) in accordance with preferred embodiments.

Referring now FIG. 2, there is shown example apparatus generally designated by the reference character 200 for implementing touchdown measurement using thermal and voltage actuation for hard disk drives (HDDs) of the preferred embodiments.

As shown in FIG. 2, the touchdown measurement apparatus 200 includes a recording head 202, provided with the slider 120. The head 202 includes a main magnetic pole (MP) 204, an optional energy assist element 206, and a trailing shield 208 of a head writer. As shown, the head 202 includes a coil 214 positioned proximate the main magnetic pole MP 204, a reader 216, and a thermal flying height control (TFC) 218. The head 202 includes the air bearing surface 222 of the head 202 that is disposed proximate to the disk surface 124 of disk 126.

In accordance with features of the preferred embodiments, an ultrafast touchdown method is provided, advantageously used for targeted touchdown on a localized region of the disk. Such a targeted touchdown on particular localized regions of the disk is extremely beneficial in large form factor drives, such as those used in cold storage, where clearance variations around the disk revolution can be very large. In addition, due to longer rest periods in cold storage devices, it may be necessary to frequently recalibrate the touchdown power (TDP) of the head on the disk in the field.

In accordance with features of the preferred embodiments, the ultrafast touchdown method enables an efficient and ultrafast touchdown power (TDP) mapping over the entire disk in the field. Also the targeted touchdown is very beneficial is in distinguishing TDP changes on different data zones on disk media where the clearance variations could be different between different data sector regions. This benefit automatically extends to various combined technologies in hard disk drives (HDDs).

In accordance with features of the preferred embodiments, the ultrafast touchdown method includes a simultaneous application of a voltage bias in conjunction with a constant power applied to the thermal flyheight control (TFC) to bring the slider into contact with the disk. The spacing between the slider and the disk is completely bridged, that is touchdown is achieved using constant power applied to the TFC as a coarse actuator and the disk slider voltage bias as an ultra fast small amplitude actuator. A method for completely bridging the gap between the head and the disk, obtaining the touchdown power (TDP) with ultrafast capability does not presently exist. The novel method of the preferred embodiments includes a successful actuation to touchdown, and eventual calibration of the combined voltage and thermal actuation to actual spacing change and enables TDP measurement as well as a practical calibration method.

In accordance with features of the preferred embodiments, the coarse actuation of the slider using thermal flyheight control (TFC) has a bandwidth limited by the thermal protrusion time constant, which is in the order of few 100 us, but coupling it to the voltage bias actuation, which is extremely fast with a selected pulse width or duration of at least 0.5 microseconds to approximately 10 microseconds, touchdown experiments can be performed with short pulse durations, short enough to last just one sector length. The clearance change from the applied voltage bias can be calibrated to equivalent mW of TFC power to translate the touchdown power (TDP) using the ultrafast touchdown method into the traditional TDP currently reported.

Figure 3:
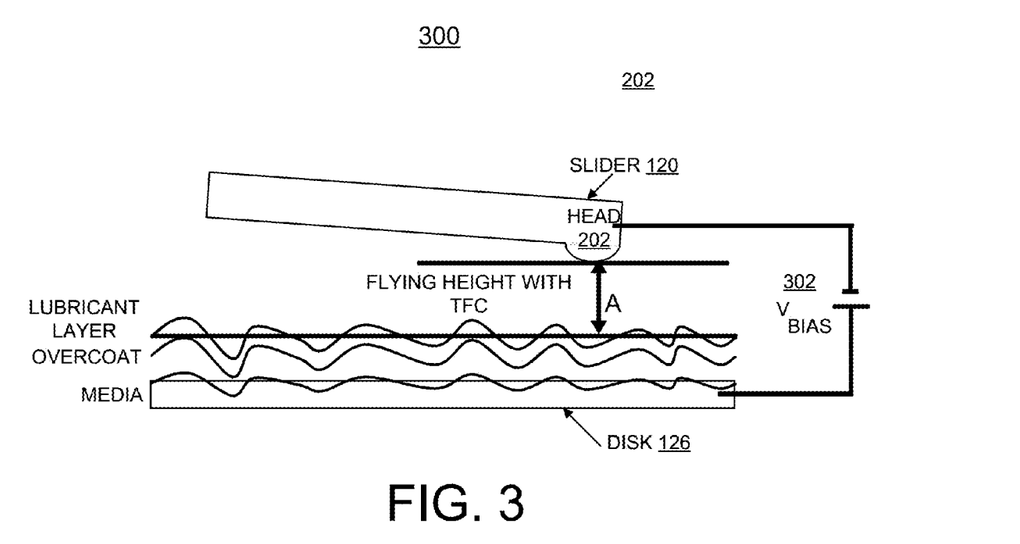
FIG. 3 schematically illustrates a cross-sectional view of the slider-disk interface within an example apparatus for implementing touchdown measurement using thermal and voltage actuation for hard disk drives (HDDs) in accordance with preferred embodiments.

Referring now to FIG. 3, there is shown example apparatus generally designated by the reference character 300 for implementing touchdown measurement using thermal and voltage actuation for hard disk drives (HDDs) in accordance with preferred embodiments. Apparatus 300 implements touchdown measurement using a constant power applied to the thermal flyheight control (TFC) 218 and an electrostatic voltage bias pulse or interface bias voltage BIAS is applied by bias voltage 302 between the slider body 120 and the disk 126 to actuate the slider into contact with the disk. The electrostatic voltage bias pulse or interface bias voltage BIAS is applied to the disk 126 or to the head or slider 120. A flying height with the constant power applied to the thermal flyheight control (TFC) 218 is indicated by an arrow A. For example, a negative voltage bias pulse 302 is applied to the slider 120 to actuate the slider closer to the disk, increasing the amplitude of the voltage pulse until contact/TDP is achieved, for example, by monitoring the motor current, VCM gain, or other parameter. The voltage pulse is synchronized to a particular sector allowing for targeted touchdown power (TDP) measurement on that particular sector.

In accordance with features of the preferred embodiments, the touchdown method is extremely fast, the localized TDP to a specific sector of the disk can be obtained, providing the change in TDP around the revolution of the disk at a specific track/radius location. In addition to providing the targeted TDP (clearance) information at different sectors on the disk, the short duration of touchdown inherently decreases the amount of head wear during touchdown measurement. Furthermore, the application of a negative bias to the slider is known to further decrease the head wear, in other words, every short duration contact also is designed to have lower head wear by favorably applying a negative voltage bias to the slider while actuating the slider closer to the disk.

Figure 4:
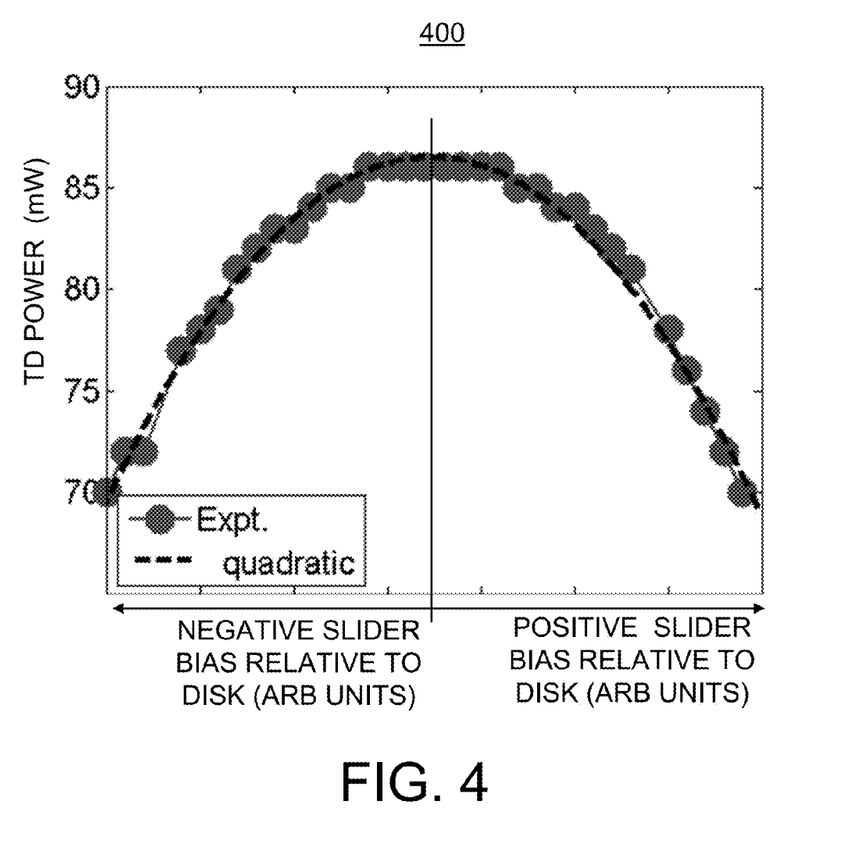
FIG. 4 is an example waveform with touchdown (TD) power shown with respect to the vertical axis with slider bias relative to the disk shown with respect to the horizontal axis illustrating calibration of the interface bias voltage (BIAS) to thermal flyheight control (TFC) power in accordance with preferred embodiments.

Referring now to FIG. 4, there is shown an example waveform generally designated by the reference character 400 with touchdown (TD) power shown with respect to the vertical axis with negative and positive slider bias relative to the disk shown with respect to the horizontal axis illustrating calibration of the interface bias voltage (BIAS) to thermal flyheight control (TFC) power in accordance with preferred embodiments. A calibration allows the conversion of the applied voltage bias to achieve touchdown into the equivalent TFC power/clearance.

Figure 5:
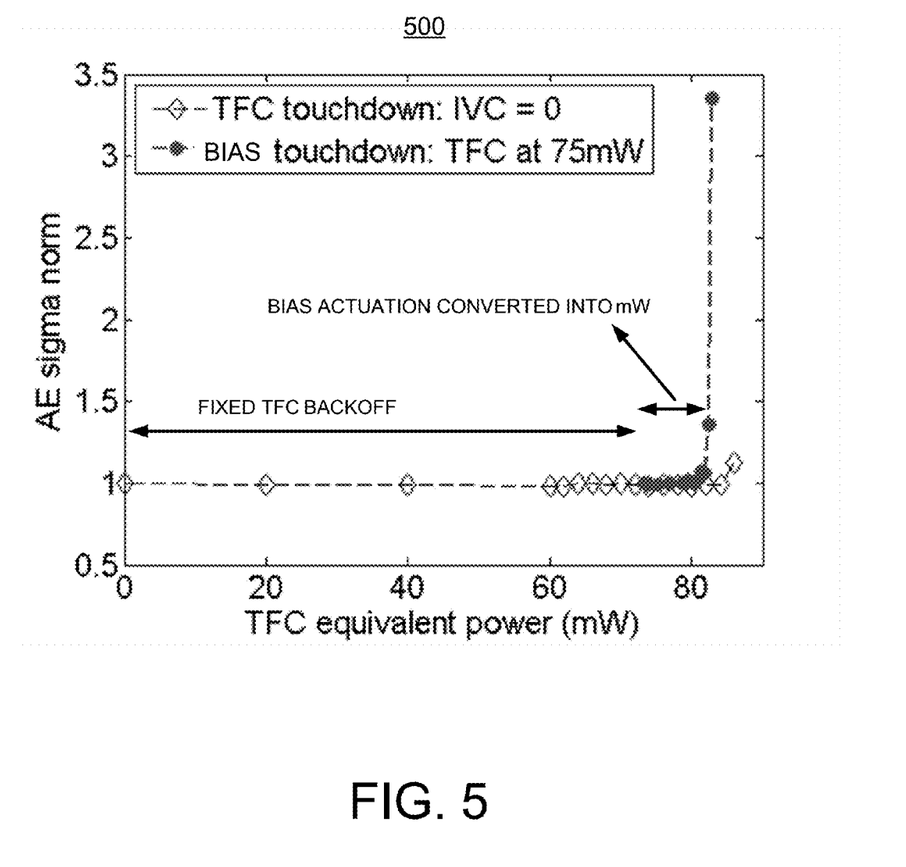
FIG. 5 is an example waveform with AE sigma norm shown with respect to the vertical axis with thermal flyheight control (TFC) power shown with respect to the horizontal axis illustrating interface voltage (BIAS) to actuate the slider into contact in accordance with preferred embodiments.

Referring now FIG. 5, there is shown an example waveform with normalized AE sigma shown with respect to the vertical axis with thermal flyheight control (TFC) power shown with respect to the horizontal axis illustrating interface bias voltage (BIAS) to actuate the slider into disk contact generally designated by the reference character 500 in accordance with preferred embodiments. TFC back-off by the applied constant power to the thermal flyheight control (TFC) is maintained at a value that allows the head to come close enough to the disk so that touchdown may be achieved with the applied interface voltage.

Figure 6:
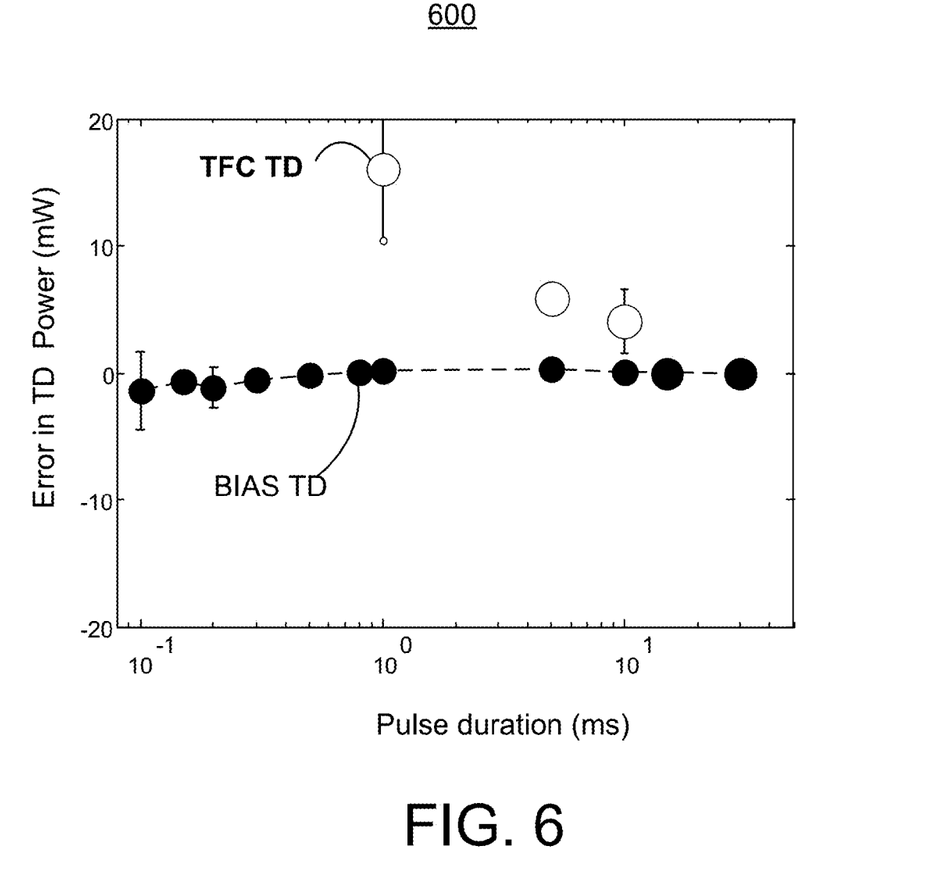
FIG. 6 illustrates example waveforms of respective TFC and BIAS touchdown with error in touchdown (TD) power shown relative the vertical axis and pulse duration shown relative the horizontal axis in accordance with preferred embodiments.

Referring now to FIG. 6, there are shown example waveforms generally designated by the reference character 600 of BIAS TD and of TFC TD in accordance with preferred embodiments. In accordance with preferred embodiments a constant TFC power is applied to hold the slider in slight pull-back or back-off clearance condition and an interface bias voltage BIAS TD actuates the slider until contact with the disk is achieved. As shown as the pulse width is decreased, the error in TFC TD is largest, while for the interface bias voltage BIAS TD with TFC backoff, this error is reduced even for short pulse widths.

Figure 7:
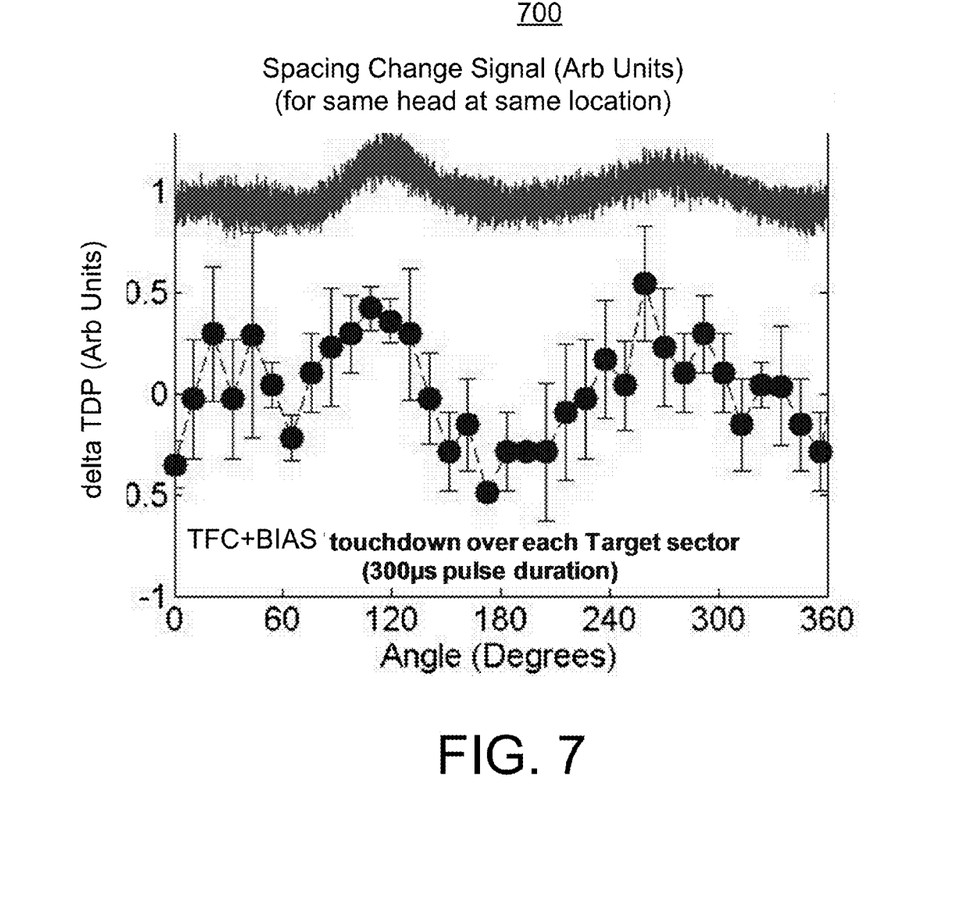
FIG. 7 illustrates example waveforms of respective sector based touchdown detection with delta touchdown power (TDP) shown with respect to the vertical axis and angle in degrees shown with respect to the horizontal axis in accordance with preferred embodiments.

Referring now to FIG. 7 there are shown example waveforms of respective sector based touchdown detection generally designated by the reference character 700 with delta touchdown power (TDP) in arbitrary units shown with respect to the vertical axis and angle in degrees shown with respect to the horizontal axis in accordance with preferred embodiments. As illustrated, the touchdown power (TDP) variation captured around the revolution is qualitatively corroborated with spacing change observed in the illustrated spacing change signal in arbitrary units for the same head at the same location. TFC and BIAS touchdown is provided over each target sector, for example, with 300 us pulse duration.

Head wear can be tuned, for example by two orders of magnitude by favorable applying a negative interface bias voltage BIAS or negative bias to the slider relative to the disk. Ultrafast touchdown with reduced wear allows lower mechanical clearances as needed for future drives without adding additional sensors like humidity and pressure sensors to the drive. Wear prevention on the head enables protection from mechanical stress and contact.

Figure 8:
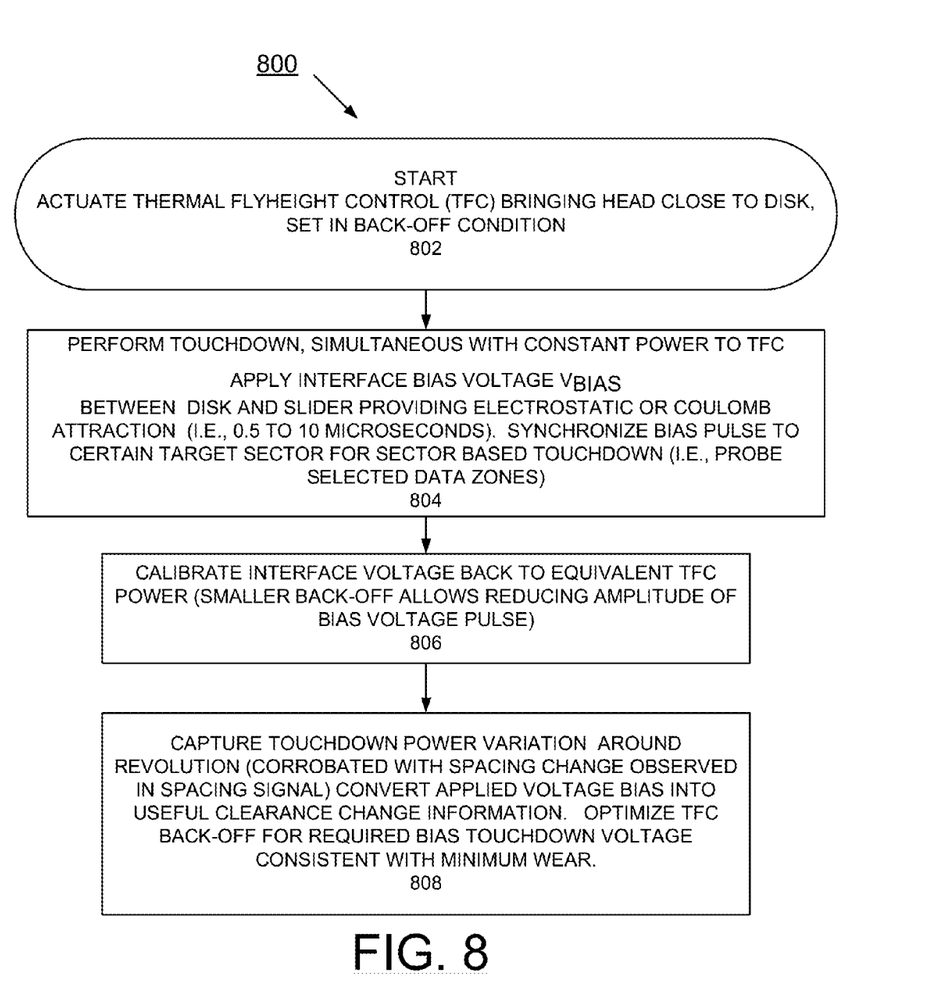
FIG. 8 is a flow chart illustrating example operations for implementing touchdown measurement using thermal and voltage actuation for hard disk drives (HDDs) in accordance with preferred embodiments.

Referring now to FIG. 8, there are shown example operations generally designated by the reference character 800 for implementing touchdown measurement using thermal and voltage actuation HDDs in accordance with preferred embodiments. As indicated in a block 802 thermal flyheight control (TFC) is actuated bringing the head close to the disk, and set in a back-off condition. Touchdown is performed to actuate the slider into disk contact, by applying an interface bias voltage BIAS between the disk and slider providing electrostatic or coulomb attraction, for example, between 0.5 and 10 microseconds, simultaneously with constant power applied to the TFC, as indicated in a block 804. The interface bias voltage BIAS pulse is synchronized to a certain target sector for sector based touchdown, for example, to probe selected data zones performed at block 804. Synchronizing the voltage pulse to a particular sector allows for targeted touchdown power (TDP) measurement on that particular sector. As indicated in a block 806 the interface bias voltage BIAS is calibrated back to an equivalent TFC power, where a smaller back-off allows reducing amplitude of interface bias voltage BIAS pulse.

In accordance with features of the preferred embodiments, a calibration allows the conversion of the applied voltage bias to achieve touchdown into the equivalent TFC power/clearance at block 806. As indicated in a block 808, touchdown power (TDP) variation around revolution is captured. By carefully calibrating the applied voltage bias to the clearance change (which typically is reported as mW of TFC power), the voltage bias applied is easily converted into useful clearance change information. TFC back-off is optimized so required touchdown voltage is consistent with minimum wear at block 808.

Figure 9:
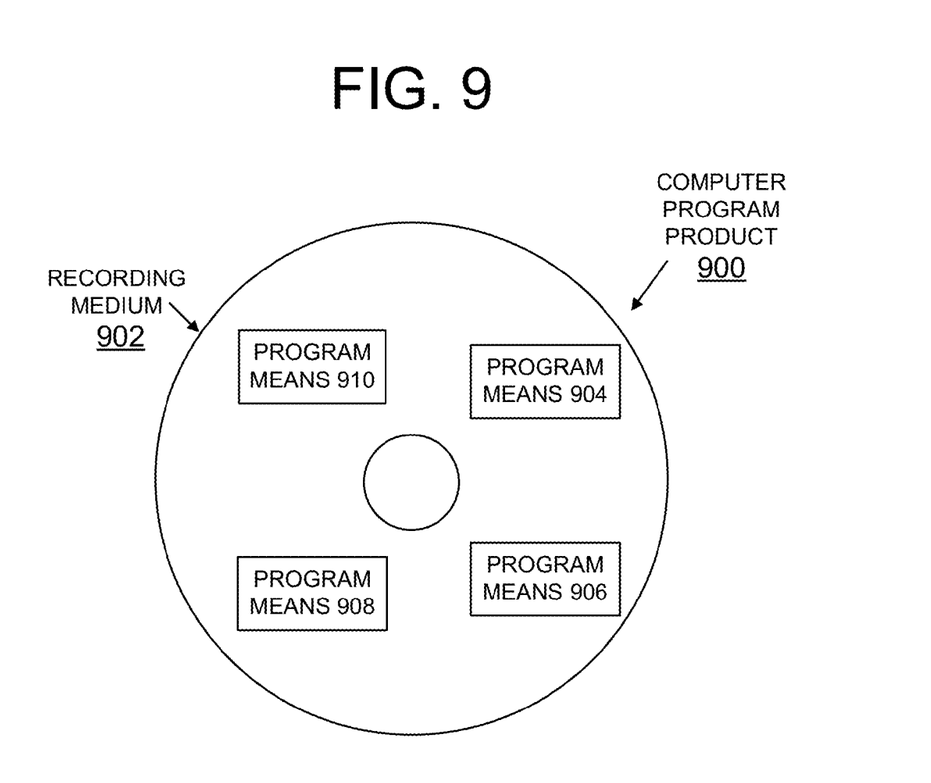
FIG. 9 is a block diagram illustrating a computer program product in accordance with preferred embodiments.

Referring now to FIG. 9, an article of manufacture or a computer program product 900 of the preferred embodiments is illustrated. The computer program product 900 includes a computer readable recording medium 902, such as, a floppy disk, a high capacity read only memory in the form of an optically read compact disk or CD-ROM, a tape, or another similar computer program product. Computer readable recording medium 902 stores program means or control code 904, 906, 908, 910 on the medium 902 for carrying out the methods for implementing touchdown measurement using thermal and voltage actuation for hard disk drives in accordance with preferred embodiments in the system 100 of FIG. 1.

A sequence of program instructions or a logical assembly of one or more interrelated modules defined by the recorded program means or control code 904, 906, 908, 910, direct HDD controller 114 for implementing touchdown measurement using thermal and voltage actuation during HDD operation of preferred embodiments.

While the present invention has been described with reference to the details of the embodiments of the invention shown in the drawing, these details are not intended to limit the scope of the invention as claimed in the appended claims.

What is claimed is:
1. A method for implementing touchdown measurement using thermal and voltage actuation for hard disk drives (HDDs), said method comprising:
applying a constant power to a thermal flyheight control (TFC), and simultaneously applying an electrostatic voltage bias pulse between a slider and the disk to actuate the slider into contact with the disk.

2. The method as recited in claim 1, wherein applying a constant power to a thermal flyheight control (TFC) includes applying a constant power to hold the slider in a back-off clearance condition.

3. The method as recited in claim 1, wherein simultaneously applying an electrostatic voltage bias pulse includes applying the electrostatic voltage bias pulse with a duration of about 0.5 microseconds or longer.

4. The method as recited in claim 1, wherein simultaneously applying an electrostatic voltage bias pulse includes applying the electrostatic voltage bias pulse in a voltage range between +/−2 Volts.

5. The method as recited in claim 1, includes synchronizing applying the electrostatic voltage bias pulse with a particular sector of the disk.

6. The method as recited in claim 1, includes calibrating the applied electrostatic voltage bias pulse to an equivalent TFC power.

7. The method as recited in claim 1, includes providing a TFC back-off clearance condition enabling touchdown with the applied electrostatic voltage bias pulse on a particular sector of the disk.

8. An apparatus for implementing touchdown measurement using thermal and voltage actuation for hard disk drives (HDDs), comprising:
   a controller;
   at least one disk; said disk including a disk media for storing data; and
   a slider;
   said controller applying a constant power to a thermal flyheight control (TFC), and
   said controller simultaneously applying an electrostatic voltage bias pulse between the slider and the disk to actuate the slider into contact with the disk.

9. The apparatus as recited in claim 8 includes control code stored on a non-transitory computer readable medium, and wherein said controller uses said control code to implement touchdown measurement.

10. The apparatus as recited in claim 8 wherein said controller simultaneously applying an electrostatic voltage bias pulse includes said controller applying the electrostatic voltage bias pulse with a selected duration of about 0.5 microseconds or longer.

11. The apparatus as recited in claim 8 includes said controller synchronizing applying the electrostatic voltage bias pulse with a particular sector of the disk.

12. The apparatus as recited in claim 8 includes said controller calibrating the applied electrostatic voltage bias pulse to an equivalent TFC power.

13. The apparatus as recited in claim 8 includes said controller providing a TFC back-off clearance condition enabling touchdown with the applied electrostatic voltage bias pulse on a particular sector of the disk.

14. The apparatus as recited in claim 8 wherein said controller simultaneously applying an electrostatic voltage bias pulse includes said controller applying the electrostatic voltage bias pulse in a voltage range between +/−2 Volts.

15. A system for implementing touchdown measurement using thermal and voltage actuation for hard disk drives (HDDs), comprising:
   a hard disk drive (HDD), said HDD comprising a controller;
   at least one disk; said disk including a disk media for storing data; and
   a slider;
   said controller applying a constant power to a thermal flyheight control (TFC), and
   said controller simultaneously applying an electrostatic voltage bias pulse between the slider and the disk to actuate the slider into contact with the disk.

16. The system as recited in claim 15 includes control code stored on a non-transitory computer readable medium, and wherein said controller uses said control code to implement touchdown measurement.

17. The system as recited in claim 15 wherein said controller applying a constant power to a thermal flyheight control (TFC) includes said controller applying a constant power to hold the slider in a back-off clearance condition.

18. The system as recited in claim 15 wherein said controller simultaneously applying an electrostatic voltage bias pulse includes said controller applying the electrostatic voltage bias pulse with a duration of about 0.5 microseconds or longer.

19. The system as recited in claim 15 includes said controller synchronizing applying the electrostatic voltage bias pulse with a particular sector.

20. The system as recited in claim 15 includes said controller providing a TFC back-off clearance condition enabling touchdown with the applied electrostatic voltage bias pulse on a particular sector of the disk.

\* \* \* \* \*